US008130861B2

(12) United States Patent
Duan et al.

(10) Patent No.: US 8,130,861 B2
(45) Date of Patent: *Mar. 6, 2012

(54) RADIO COMMUNICATION APPARATUS AND RADIO COMMUNICATION METHOD

(75) Inventors: Jinsong Duan, Kanagawa (JP); Keisuke Ebiko, Kanagawa (JP); Ryohei Kimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/075,042

(22) Filed: Mar. 29, 2011

(65) Prior Publication Data

US 2011/0176595 A1    Jul. 21, 2011

Related U.S. Application Data

(63) Continuation of application No. 12/297,617, filed as application No. PCT/JP2006/308461 on Apr. 21, 2006, now Pat. No. 7,940,851.

(51) Int. Cl.
*H04B 7/02* (2006.01)

(52) U.S. Cl. ........ 375/267; 375/260; 375/299; 375/347; 375/349; 375/324; 375/340; 375/358

(58) Field of Classification Search .................. 375/260, 375/299, 347, 349, 324, 340, 358, 267
See application file for complete search history.

(56) References Cited

U.S. PATENT DOCUMENTS

| 7,272,190 B2 | 9/2007 | Blankenship et al. |
| 7,542,514 B2 | 6/2009 | Song et al. |
| 2003/0054847 A1 | 3/2003 | Kim et al. |
| 2005/0128993 A1 | 6/2005 | Yu et al. |
| 2006/0023745 A1 | 2/2006 | Koo et al. |
| 2006/0072508 A1 | 4/2006 | Zou et al. |
| 2007/0026813 A1 | 2/2007 | Khan |

FOREIGN PATENT DOCUMENTS

| JP | 2003169036 A | 6/2003 |
| JP | 2004522387 T | 7/2004 |
| JP | 2006109458 A | 4/2006 |
| WO | 2006006770 A1 | 1/2006 |

OTHER PUBLICATIONS

Extended European Search Report for corresponding EP Application No. 06732219.8, mailed Sep. 8, 2011, 10 pages.
QUALCOMM Europe, "Control Channel Issues for DL MIMO," R1-060455, 3GPP TSG-RAN WG1 #44, Denver, USA, Feb. 13-17, 2006, 5 pages.

(Continued)

*Primary Examiner* — Kabir A Timory
(74) *Attorney, Agent, or Firm* — Seed IP Law Group PLLC

(57) ABSTRACT

A radio communication apparatus and an associated method are provided. The apparatus includes a receiving unit configured to receive first data and second data, which are transmitted from a plurality of antennas for spatial-multiplexing using a plurality of blocks, into which a plurality of consecutive subcarriers in a frequency domain are divided. The apparatus further includes a calculating unit configured to calculate a first absolute CQI value per each of the blocks for the first data and a second absolute CQI value per each of the blocks for the second data, and calculate a relative value of the second absolute CQI value with respect to the first absolute CQI value, per each of the blocks. The apparatus still further includes a transmitting unit configured to transmit the first absolute CQI value and the relative value of the second absolute CQI value in the same block.

17 Claims, 19 Drawing Sheets

OTHER PUBLICATIONS

3GPP TSG RAN WG1, TSG R1-010879, "Increasing MIMO throughput with per-antenna rate control," Aug. 2001, pp. 1-14.

3GPP TSG RAN WG1 Ad Hoc on LTE (Physical Channels and Multiplexing in Evolved UTRA Downlink, Jun. 21, 2005, 3GPP TSG RAN WG1 Ad Hoc on LTE, France, R1-050590, pp. 1-24).

Ericsson et al., "Adaptive Modulation and Channel Coding Rate Control for Frequency Domain Scheduling in Evolved UTRA Downlink," Report R1-051149, 3rd Generation Partnership Project (3GPP TM) TSG RAN WG1 Meeting #42bis, San Diego, Oct. 10-14, 2005, pp. 1-10.

International Search Report dated Jul. 25, 2009 with English Translation.

Notice of the Reasons for Rejection mailed Mar. 16, 2010, issued in corresponding Japanese Patent Application No. 2008-511925, 2 pages.

Notice of the Reasons for Rejection mailed Jan. 5, 2010, issued in corresponding Japanese Patent Application No. 2008-511925, filed Apr. 17, 2008, 4 pages.

NTT DoCoMo, et al., "AMC and HARQ Using Frequency Domain Channel-Dependent Scheduling in MIMO Channel Transmission," Report R1-050942, 3rd Generation Partnership Project (3GPP TM) TSG RAN WG1 Meeting #42 on LTE, London, Aug. 29-Sep. 2, 2005, pp. 1-8.

NTT DoCoMo, et al., "Physical Channels and Multiplexing in Evolved UTRA Downlink," Report R1-050707, 3rd Generation Partnership Project (3GPP TM) TSG RAN WG1 Meeting #42 on LTE, London, Aug. 29-Sep. 2, 2005, pp. 1-15.

Qualcomm Europe, "Description and Link Simulations of MIMO Schemes for OFDMA Based E-UTRA Downlink Evaluation," Report R1-050903, 3rd Generation Partnership Project (3GPP TM) TSG RAN WG1 Meeting #42 on LTE, London, Aug. 29-Sep. 2, 2005, pp. 1-12.

QUALCOMM Europe, "Description of Single and Multi Codeword Schemes with Precoding," R1-060457, 3GPP TSG-RAN WG1 #44, Denver, USA, Feb. 13-17, 2006, pp. 1-9.

LG Electronics, "L1/L2 signaling for CQI reporting considering multiple streams transmission," R1-060920, 3Gpp TSG RAN WG1 #44bis meeting, Athens, Greece, Mar. 27-31, 2006, 6 pages.

RADIO COMMUNICATION APPARATUS AND RADIO COMMUNICATION METHOD

BACKGROUND

1. Technical Field

The present invention relates to a MIMO receiving apparatus and a MIMO transmitting apparatus. More particularly, the present invention relates to a MIMO receiving apparatus and MIMO transmitting apparatus in which the transmitting system performs transmission control on a per antenna basis by feedback information from the receiving system.

2. Background Art

In standardization of 3GPP Long Term Evolution (LTE), PARC (Per Antenna Rate Control) scheme, which is one of MIMO (Multi Input Multi Output) transmission schemes, is discussed. In PARC, modulation and coding schemes are selected according to channel quality (CQI) report values on a per transmission antenna (stream) basis. Patent Document 1 discloses a conventional MIMO PARC scheme.

FIG. 1 shows a configuration of the MIMO transmitting apparatus in the MIMO communication system adopting the conventional MIMO PARC scheme. As shown in the figure, the MIMO transmitting apparatus transmits pilot signals on a per antenna basis by using several subcarriers. On the other hand, the receiving apparatus (not shown) measures the received intensity of each pilot signal transmitted from the antennas in the MIMO transmitting apparatus, generates a CQI (channel quality indicator) per antenna based on the channel quality condition for each antenna, and feeds back the CQIs to the MIMO transmitting apparatus. The MIMO transmitting apparatus determines the optimal modulation scheme (QPSK, 16QAM, 64QAM and so on) and coding rate on a per antenna basis based on the CQI information per antenna and transmits substreams from the antennas. In this way, by selecting optimal modulation and coding scheme based on the channel quality condition of each antenna, the maximum peak rate and communication capacity are achieved. Non-patent Document 1: Lucent 3GPP R1-010879

DISCLOSURE OF INVENTION

Problems to be Solved by the Invention

However, the conventional MIMO communication system has a problem of increasing the CQI feedback overhead in proportion to the number of antennas (i.e. streams). Moreover, when the transmitting side performs frequency scheduling, CQI is required per chunk, which is a subcarrier block, and therefore the above problem is further prominent.

It is therefore an object of the present invention to provide a MIMO receiving apparatus and MIMO transmitting apparatus that can reduce the amount of feedback information and system traffic.

Means for Solving the Problem

The MIMO receiving apparatus of the present invention adopts a configuration including: a communication quality measuring section that measures communication quality of individual antennas using pilot signals transmitted from antennas of a transmitting side; a transmitting section that feeds back feedback information based on the communication quality to the transmitting side; a relative value calculating section that calculates relative values of the communication quality for the antennas between the communication quality of a reference antenna and the communication quality of the antennas other than the reference antenna in the antennas in the transmitting side; and a feedback information generating section that generates the feedback information from an absolute value of the communication quality of the reference antenna and the relative values of the communication quality.

The MIMO transmitting apparatus of the present invention adopts a configuration including: a receiving section that receives feedback information containing absolute values of communication quality of a reference antenna and relative values of communication quality of antennas other than the reference antenna; a feedback information processing section that calculates communication quality of each antenna from the feedback information; and a transmission control section that controls transmission of substreams via the antennas based on the calculated communication quality.

ADVANTAGEOUS EFFECT OF THE INVENTION

According to the present invention, a MIMO receiving apparatus and MIMO transmitting apparatus that can reduce the amount of feedback information and system traffic is provided.

BEST MODE FOR CARRYING OUT THE INVENTION

Figure 1:
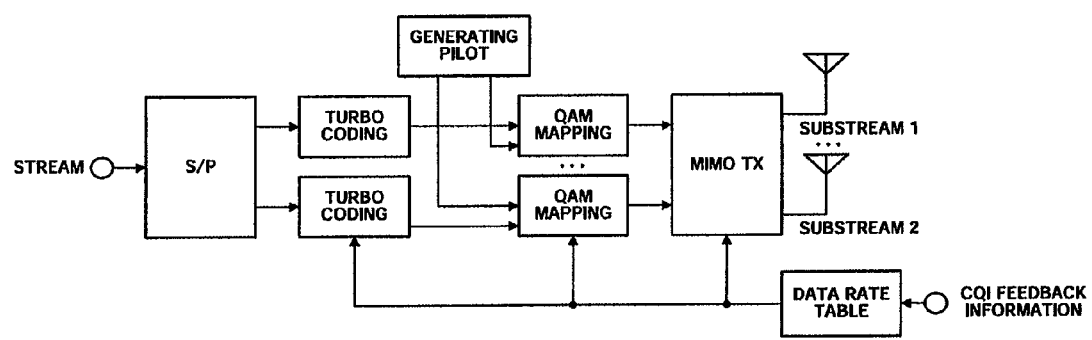
FIG. 1 is a block diagram showing a configuration of the conventional MIMO transmitting apparatus.

Now, embodiments of the present invention will be described in detail with reference to the accompanying drawings. In embodiments, the components having the same functions will be assigned the same reference numerals and overlapping descriptions will be omitted.

(Embodiment 1)

Figure 2:
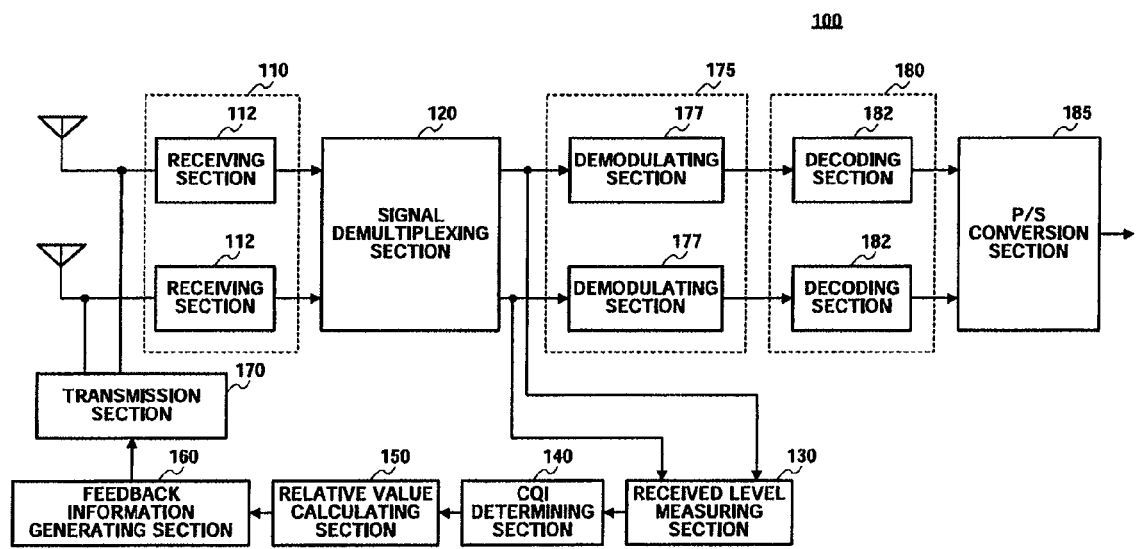
FIG. 2 is a block diagram showing a configuration of the radio communication apparatus of the receiving system according to Embodiment 1.

As shown in FIG. 2, radio communication apparatus 100 in the MIMO (Multi Input Multi Output) communication system according to Embodiment 1 has a plurality of antennas, receiving section 110, signal demultiplexing section 120, received level measuring section 130, CQI determining section 140, relative value calculating section 150, feedback information generating section 160, transmitting section 170, demodulating section 175, decoding section 180 and P/S conversion section 185.

Receiving section 110, which has the same number of receiving sections 112 as the antennas, receives a space-multiplexed signal, in which signals transmitted from the transmission system in the MIMO communication system are space-multiplexed, and performs radio receiving processing on the received signal. When transmission signals transmitted from the individual antennas of the transmission system form an OFDM signal, which is one kind of multicarrier signal, receiving section 110 performs OFDM receiving processing including FFT processing and P/S conversion processing in addition to normal radio receiving processing (e.g. down-conversion and A/D conversion processing). Moreover, receiving section 110 receives a pilot signal transmitted from each antenna in the transmission system and performs receiving processing.

Signal demultiplexing section 120 demultiplexes the signal after radio receiving processing in receiving section 110 into the signals transmitted from the individual antennas of the transmission system (i.e. corresponding to the substreams in the transmission system and therefore hereinafter may be referred to as "substreams") using methods including MMSE (Minimum Mean Square Error) and so on. Moreover, signal demultiplexing section 120 receives as input the pilot signal after receiving processing in receiving section 110, and outputs the pilot signals of the individual antennas utilized for transmission in the transmission system (corresponding to the substreams in the transmission system).

Received level measuring section 130 measures the received levels of the pilot signals, which are demultiplexed in signal demultiplexing section 120, of the individual antennas (e.g. SINR: Signal-to-Interference and Noise Power Ratio) and outputs the received levels of the pilot signals to CQI determining section 140.

CQI determining section 140 stores a CQI table and determines the CQI value of each substream based on the received levels of the pilot signals measured in received level measuring section 130.

Relative value calculating section 150 calculates relative CQI values between the CQI value of the reference substream and the CQI values of substreams other than the reference substream. In the present embodiment, the reference substream is determined in advance and fixed. The substreams correspond to the individual antennas of the transmission system respectively, so that the reference substream may be regarded as "the reference antenna," and relative value calculating section 150 may be construed to calculate relative CQI values between the CQI value of the reference antenna and the CQI values of the antennas other than the reference antenna.

Feedback information generating section 160 generates feedback information for the transmission system from the CQI value of the reference substream and the relative CQI values found for the streams other than the reference substream.

Transmitting section 170 transmits the feedback information generated in feedback information generating section 160 to the transmission system using at least one of a plurality of antennas provided in radio communication apparatus 100. That is, transmitting section 170 may transmit the feedback information to the transmission system by a transmission scheme using one antenna or by a multi-antenna communication scheme such as MIMO communication scheme and space-time coding communication scheme.

Demodulating section 175, which has demodulating sections 177 matching the number of the substreams, demodulates each substream demultiplexed in signal demultiplexing section 120.

Decoding section 180, which has decoding sections 182 matching the number of the substreams, decodes each substream after demodulating processing.

P/S conversion section 185 performs parallel-to-serial conversion on the substreams after decoding processing, and outputs the result as a serial data sequence.

Figure 3:
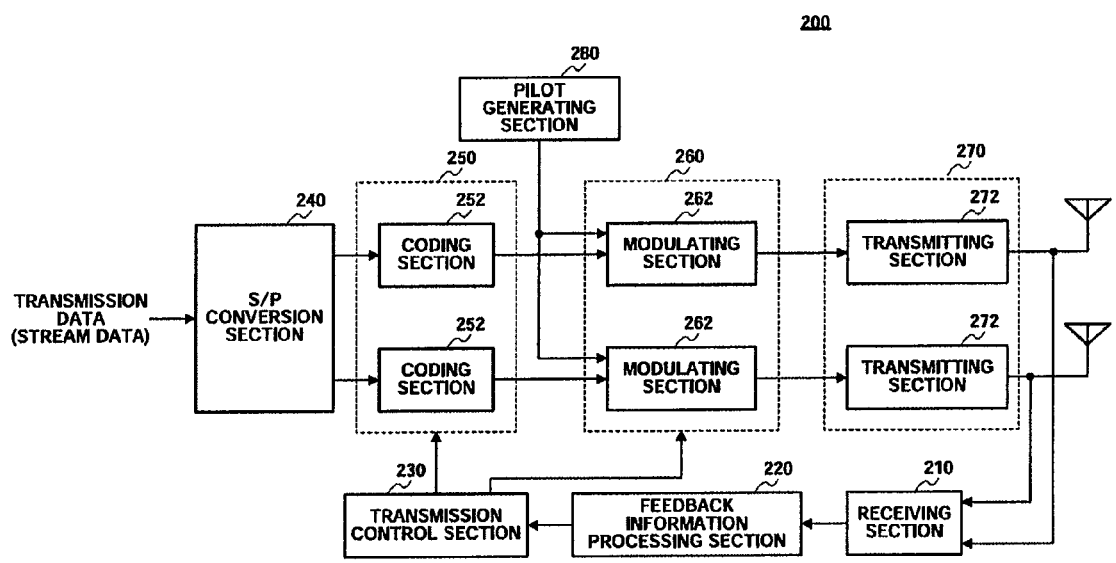
FIG. 3 is a block diagram showing a configuration of the radio communication apparatus of the transmitting system according to Embodiment 1.

As shown in FIG. 3, radio communication apparatus 200 of the transmission system, has a plurality of antennas, receiving section 210, feedback information processing section 220, transmission control section 230, S/P conversion section 240, coding section 250, modulating section 260, transmitting section 270 and pilot generating section 280.

Receiving section 210 performs radio receiving processing on feedback information, which is from radio communication apparatus 100, and which is received through at least one of the antennas in radio communication apparatus 200. To be more specific, receiving section 210 performs receiving processing on feedback information in a reception scheme corresponding to the transmission scheme applied in transmitting section 170 of radio communication apparatus 100, and outputs the feedback information after receiving processing to feedback information processing section 220.

Feedback information processing section 220 calculates the CQI value of each substream from the feedback information from receiving apparatus 210. To be more specific, as described above, the feedback information from radio communication apparatus 100 contains the CQI value of the reference substream and the relative CQI values found for the substreams other than the reference substream, so that feedback information processing section 220 calculates the CQI value of each substream from the relative CQI values found between the CQI value of the reference substream and the substreams other than the reference substream.

Transmission control section 230, which stores a CQI table that is the same as in radio communication apparatus 100, outputs the coding rates, modulation schemes and so on, associated with the CQI values of the individual substreams calculated in feedback information processing section 220 to coding section 250 and modulating section 260.

S/P conversion section 240 converts inputted transmission data (stream data) from serial to parallel, and divides the transmission data into a plurality of substreams.

Coding section 250, which has coding sections 252 matching the number of the substreams, encodes the individual substreams based on the coding rate of each substream received from transmission control section 230.

Modulating section 260, which has modulating sections 262 matching the number of the substreams, modulates the substreams based on the modulation scheme of each substream (e.g. QPSK, 16QAM, 64QAM and so on) received from transmission control section 230. Moreover, modulating section 260 modulates the pilot signals generated in pilot generating section 280. Further, modulating section 260 performs OFDM modulation processing including S/P conversion processing and IFFT processing when radio communication apparatus 200 transmits OFDM signals from the antennas.

Transmitting section 270, which has transmitting sections 272 matching the number of the substreams, performs radio processing including D/A conversion and up-conversion for the substreams and transmits them from the corresponding antennas. Moreover, transmitting section 270 performs radio processing on the pilot signals modulated in modulating section 260 and transmits them from the corresponding antennas.

Next, the operations of radio communication apparatus 100 and radio communication apparatus 200 having the above-described configurations will be explained.

In radio communication apparatus 100, a signal after receiving processing in receiving section 110 is demultiplexed into substreams using methods including MMSE (Minimum Mean Square Error) in signal demultiplexing section 120.

In received level measuring section 130, the received levels of the pilot signals demultiplexed in signal demultiplexing section 120 are measured per antenna of the transmission system. To be more specific, when the pilot signals are transmitted in the form of OFDM signals from the antennas in radio communication apparatus 200, received level measuring section 130 measures the received level of each pilot signal on a per chunk basis, and outputs an "average received level," which is an average of all chunks in one CQI reporting cycle, to CQI determining section 140. Here, a "chunk" refers to a bundle of consecutive subcarriers in the frequency domain.

In CQI determining section 140, the CQI value of each substream is determined based on the "average received levels" of the pilot signals from received level measuring section 130. In relative value calculating section 150, relative CQI values are calculated between the CQI value of the reference substream and the CQI values of substreams other than the reference substream.

In feedback information generating section 160, feedback information for the transmission system is generated from the relative CQI values found between the CQI value of the reference substream and the substreams other than the reference substream.

Figure 4:
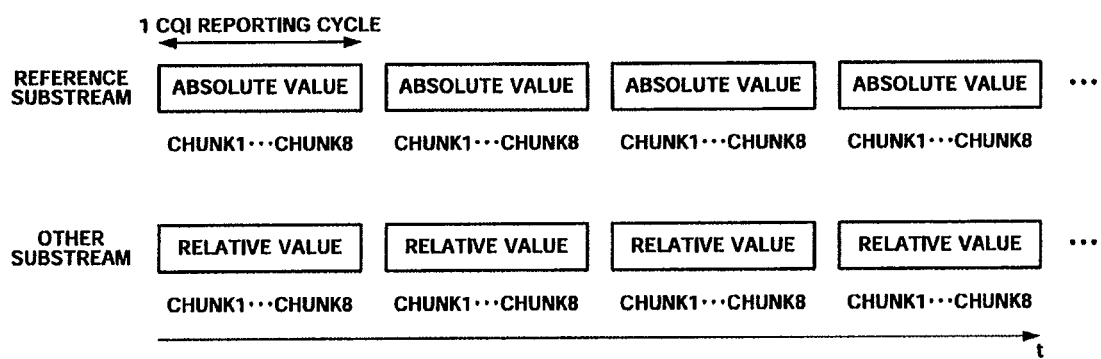
FIG. 4 explains the feedback information in Embodiment 1.

The feedback information generated in this feedback information generating section 160 will be explained with reference to FIG. 4.

As shown in the figure, as for the reference substream, a CQI value determined based on an "average received level," which is an average of all chunks (i.e. chunks 1 to 8 in the figure), is fed back to radio communication apparatus 200 every CQI reporting cycle. Moreover, as for substreams other than the reference substream ("other substreams" in the figure), relative CQI values, which are relative to the CQI value determined for the reference substream, are fed back to radio communication apparatus 200 every CQI reporting cycle.

In this way, feedback information is generated such that the CQI of the reference substream alone is given in an absolute value and the CQIs of the other substreams are given in relative CQI values with respect to the reference substream, so that it is possible to reduce the amount of feedback information, compared to conventional cases of feeding back the absolute values of the CQI values of all substreams. As a result, it is possible to reduce the traffic in the MIMO communication system. This working effect becomes prominent when the number of antennas mounted in a radio communication apparatus in the MIMO communication system increases.

In radio communication apparatus 200, receiving processing is performed on feedback information in receiving section 210, and, in feedback information processing section 220, CQI values of the individual substreams are calculated from the feedback information in receiving section 210.

In transmission control section 230, coding rates, modulation schemes and so on, associated with the CQI values of the individual substreams calculated in feedback information processing section 220, are outputted to coding section 250 and modulating section 260.

In coding section 250, coding processing is performed on the individual substreams based on the coding rate of each substream received from transmission control section 230.

In modulating section 260, modulating processing is performed on the substreams based on the modulation scheme of each substream (e.g. QPSK, 16QAM, 64QUM and so on) received from transmission control section 230.

In this way, according to Embodiment 1, radio communication apparatus 100 has: received level measuring section 130 as a communication quality measuring means for measuring communication quality (e.g. SINR) of individual antennas (corresponding to the substreams) using the pilot signals transmitted from the antennas of the transmitting side (radio communication apparatus 200); transmitting section 170 that feeds back feedback information based on the communication quality, to the transmitting side; relative value calculating section 150 as a relative value calculating means for calculating relative values of communication quality between a reference antenna and individual antennas other than the reference antenna, from communication quality of the reference antenna (corresponding to the reference substream) and communication quality of the antennas other than the reference antenna in the transmitting antennas; and feedback information generating section 160 as a feedback generating means for generating the feedback information from the absolute value of communication quality of the reference antenna and the relative values of communication quality.

By this means, the feedback information is generated such that the communication quality of the reference antenna alone is given in an absolute value and the communication quality of other antennas is given in the relative values of the communication quality with respect to the reference antenna, so that it is possible to reduce the amount of feedback information, compared to conventional cases of feeding back the absolute values of the CQI values of all antennas. As a result, it is possible to reduce the amount of overhead of control information channels and interference power by the amount in the MIMO communication system. This working effect becomes prominent when the number of antennas mounted in a radio communication apparatus in the MIMO communication system increases.

Moreover, radio communication apparatus 100 has: received level measuring section 130 that measures the received levels of the individual pilot signals transmitted from the antennas of the transmitting side (radio communication apparatus 200); CQI determining section 140 that determines the CQI value of each transmitting antenna based on the received levels; relative value calculating section 150 that calculates relative CQI values showing the relative values of the CQI values between the reference antenna and the antennas other than the reference antenna, from the CQI value determined for the reference antenna and the CQI values determined for the antennas other than the reference antenna, in the transmitting antennas by CQI determining section 140; and feedback information generating section 160 that generates feedback information for the transmitting side including the CQI value of the reference antenna and the relative CQI values.

By this means, feedback information is generated such that the CQI of the reference antenna alone is given in an absolute value and the CQIs of the other antennas are given in the relative values of the CQI with respect to the reference antenna, so that it is possible to reduce the amount of feedback information, compared to conventional cases of feeding back the absolute values of the CQI values of all antennas. As a result, it is possible to reduce the amount of overhead of control information channels and interference power in the MIMO communication system. This working effect becomes prominent when the number of antennas mounted in a radio communication apparatus in the MIMO communication system increases. Moreover, by using the CQI values used in conventional systems to generate feedback information, the present invention can be applicable for conventional systems.

Moreover, according to Embodiment 1, radio communication apparatus 200 has: receiving section 210 as a receiving means for receiving feedback information containing the absolute value of communication quality (e.g. CQI values) of the reference antenna (corresponding to the reference substream) and the relative values of communication quality of the antennas other than the reference antenna; feedback information processing section 220 as a calculating means for calculating communication quality of each antenna from the feedback information; and transmission control section 230 as a transmission control means for controlling the transmission of the substreams via the antennas based on the calculated communication quality.

By this means, it is possible to control to transmit substreams transmitted from the antennas and reduce the amount of overhead of control information channels and interference power in the MIMO communication system.

(Embodiment 2)

In Embodiment 1, the CQI value of each substream is fed back. By contrast with this, in Embodiment 2, a MIMO communication scheme of transmitting multicarrier signals (e.g. OFDM signals) from the individual antennas of the transmission system is presumed, and the CQI values of individual chunks related to substreams are fed back. The embodiments are the same in that feedback is carried out using the absolute value of the CQI value with respect to the reference substream and relative CQI values with respect to substreams other than the reference substream. In this way, by feeding back CQI values of individual chunks related to the substreams, what is commonly referred to as "frequency scheduling" for controlling subcarriers used in the transmission system can be carried out efficiently.

Figure 5:
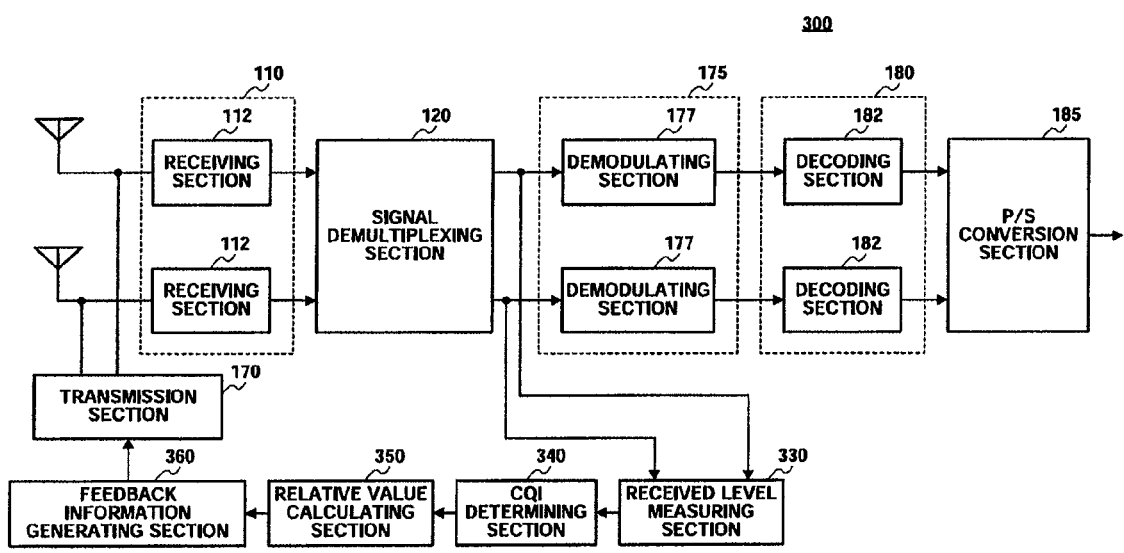
FIG. 5 is a block diagram showing a configuration of the radio communication apparatus of the receiving system according to Embodiment 2.

As shown in FIG. 5, radio communication apparatus 300 according to Embodiment 2 has received level measuring section 330, CQI determining section 340, relative value calculating section 350 and feedback information generating section 360.

Received level measuring section 330 measures the received levels (e.g. SINRs) of the individual chunks, for the pilot signals demultiplexed in signal demultiplexing section 120 of the individual antennas of the transmission system.

CQI determining section 340 determines the CQI values of the individual chunks related to the substreams based on the received levels per chunk related to the pilot signals from received level measuring section 330.

Relative value calculating section 350 calculates relative CQI values of the individual chunks (hereinafter may be referred to as "relative chunk CQI values") between the CQI value of the reference substream and the CQI values of substreams other than the reference substream. In the present embodiment, the reference substream is determined in advance and fixed.

Figure 6:
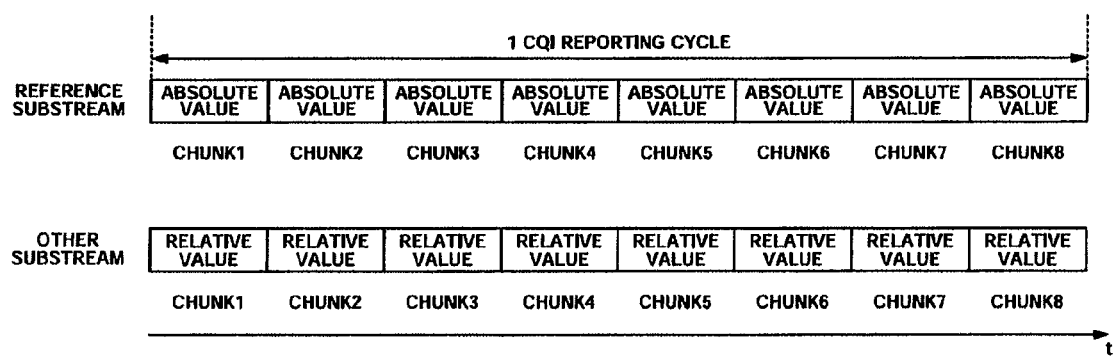
FIG. 6 explains the feedback information in Embodiment 2.

Feedback information generating section 360 generates feedback information (see FIG. 6) for the transmission system from the CQI value of each chunk related to the reference substream and the relative chunk CQI values found for the streams other than the reference substream.

Figure 7:
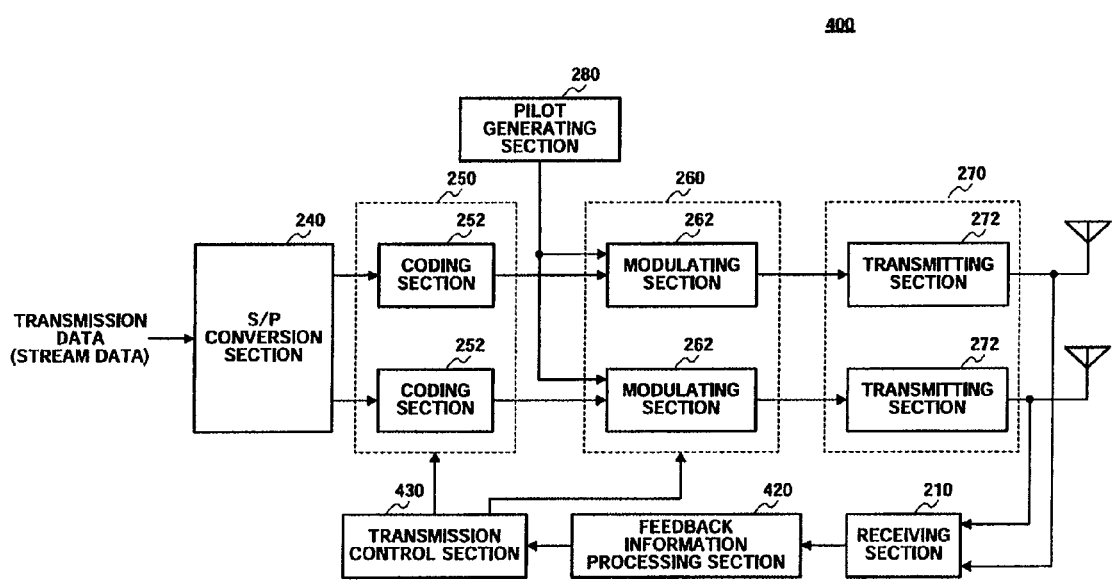
FIG. 7 is a block diagram showing a configuration of the radio communication apparatus of the transmitting system according to Embodiment 2.

As shown in FIG. 7, radio communication apparatus 400 of the transmission system has feedback information processing section 420 and transmission control section 430.

Feedback information processing section 420 calculates the CQI values of the individual chunks related to the substreams from the feedback information from receiving apparatus 210. To be more specific, the feedback information from radio communication apparatus 300 contains the CQI value of each chunk related to the reference substream and the relative chunk CQI values found for the substreams other than the reference substream, so that feedback information processing section 420 calculates the CQI values of the individual chunks related to the substreams from the CQI value of each chunk related to the reference substream and the relative chunk CQI values found for the substreams other than the reference substream.

Transmission control section 430 performs frequency scheduling for the individual substreams based on the CQI values of the individual chunks related to the substreams from feedback information processing section 420, and outputs frequency scheduling information for each substream to modulating section 260.

Modulating section 260 sequentially changes the subcarriers per substream based on the frequency scheduling information from transmission control section 430.

In this way, according to Embodiment 2, radio communication apparatus 300 has: received level measuring section 330 that measures the received levels of the individual pilot signals transmitted from the antennas of the transmitting side (radio communication apparatus 400); CQI determining section 340 that determines the CQI value of each transmitting antenna based on the received levels; relative value calculating section 350 that calculates relative CQI values showing the relative values of the CQI values between the reference antenna and the antennas other than the reference antenna, from the CQI value determined for the reference antenna and the CQI values determined for the antennas other than the reference antenna, in the transmitting antennas by CQI determining section 340; and feedback information generating section 360 that generates feedback information for the transmitting side including the CQI values of the reference antenna and the relative CQI values, and received level measuring section 330 measures the received levels per chunk formed with a plurality of subcarriers; CQI determining section 340 determines the CQI value of each chunk related to the transmitting antennas based on the received levels; relative value calculating section 350 calculates relative chunk CQI values showing relative CQI values of the individual chunks between the CQI value of the chunk determined for the reference antenna and the CQI values of the individual chunks determined for the antennas other than the reference antenna; and feedback information generating section 360 generates feedback information including the CQI value of the chunk of the reference substream and the relative chunk CQI values.

By this means, CQI values of individual chunks related to the antennas are fed back, so that what is commonly referred to as "frequency scheduling" for controlling subcarriers used in the transmission system can be carried out efficiently.

(Embodiment 3)

In Embodiment 1, the reference substream is fixed. By contrast with this, in Embodiment 3, the substream of the best communication quality every reporting cycle, is selected as the reference substream. The embodiments are the same in that feedback is carried out using the absolute value of the CQI value with respect to the reference substream and relative CQI values with respect to substreams other than the reference substream. In this way, the substream of the best communication quality is selected as the reference substream, and, by feeding back the absolute value of communication quality of the reference substream and the relative values of the substreams other than the reference substream, the reliability of CQI feedback information of the substream of the best channel communication quality especially improves. As a result, the transmission system receiving the feedback information can perform transmission control based on reliable feedback information, thereby improving system throughput.

Figure 8:
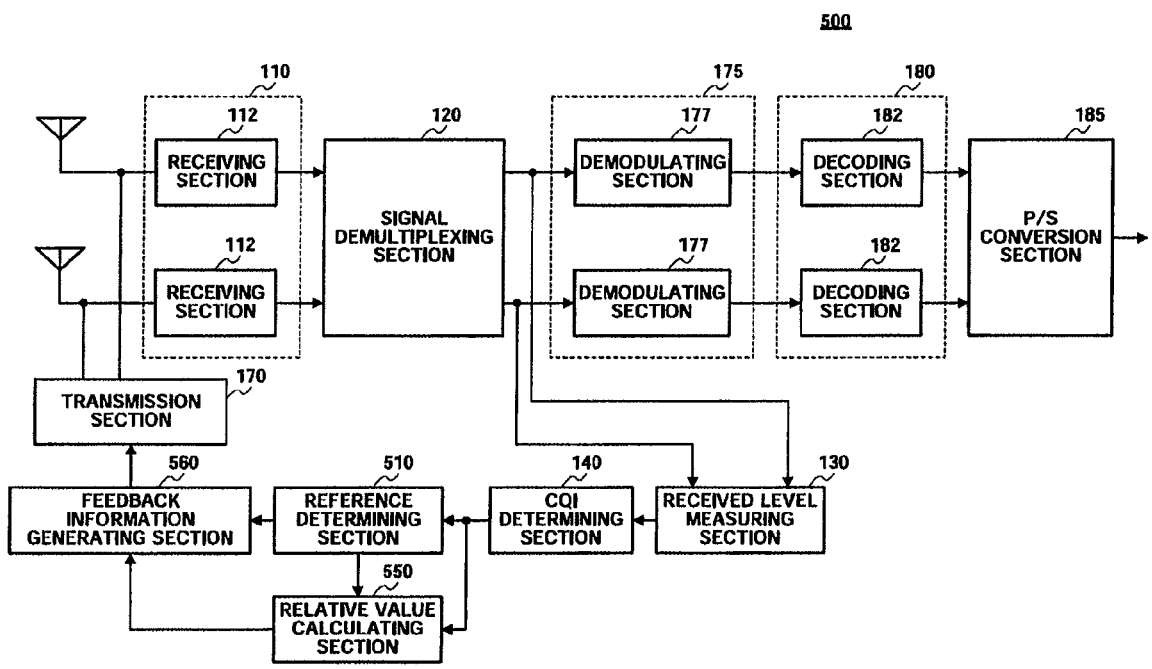
FIG. 8 is a block diagram showing a configuration of the radio communication apparatus of the receiving system according to Embodiment 3.

As shown in FIG. 8, radio communication apparatus 500 according to Embodiment 3 has reference determining section 510, relative value calculating section 550 and feedback information generating section 560.

Reference determining section 510 receives as input the CQI values for the substreams from CQI determining section 140 and determines the reference substream. To be more specific, reference determining section 510 selects the substream associated with the CQI value of the highest received level as the reference substream every CQI reporting cycle. That is, reference determining section 510 selects the reference substream based on the received level. Then, reference determining section 510 outputs information specifying the reference substream (hereinafter may be referred to as "the reference substream information") to relative value calculating section 550 and feedback information generating section 560.

Relative value calculating section 550 calculates relative CQI values between the CQI value of the reference substream selected in reference determining section 510 and the CQI values of substreams other than the reference substream.

Feedback information generating section 560 generates feedback information for the transmission system from the CQI value of the reference substream, the relative CQI values found for the streams other than the reference substream and the reference substream information (e.g. stream index information identifying the reference substream).

Figure 9:
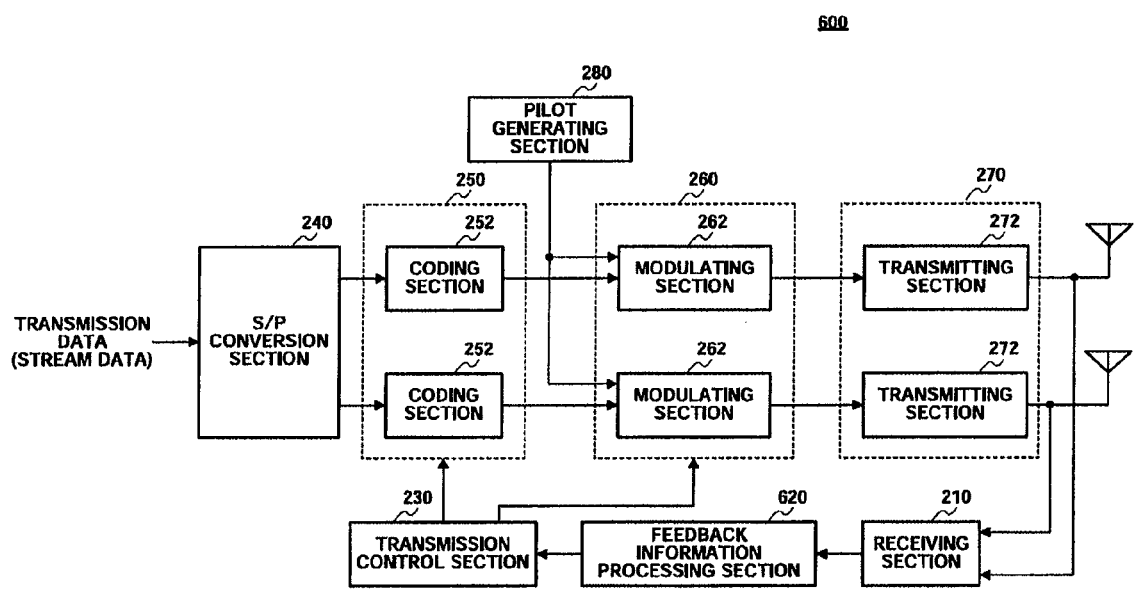
FIG. 9 is a block diagram showing a configuration of the radio communication apparatus of the transmitting system according to Embodiment 3.

As shown in FIG. 9, radio communicating apparatus 600 has feedback information processing section 620.

Feedback information processing section 620 calculates the CQI value of each substream from the feedback information from receiving apparatus 210. To be more specific, the feedback information from radio communication apparatus 500 contains the CQI value of the reference substream, the relative CQI values found for the substreams other than the reference substream and the reference substream information (e.g. stream index information identifying the reference substream), so that feedback information processing section 620 calculates the CQI value of each substream from the CQI value of the reference substream and the relative CQI values found for the substreams other than the reference substream specified from the reference substream information.

Next, the operations of radio communication apparatus 500 and radio communication apparatus 600 having the above-described configurations will be explained.

In reference determining section 510, the CQI values for the substreams from CQI determining section 140 are received as input, and the reference substream is determined. To be more specific, in reference determining section 510, the substream associated with the CQI value of the highest received level is selected as the reference substream every CQI reporting cycle. That is, in reference determining section 510, the reference substream is selected based on the received level.

In relative value calculating section 550, relative CQI values are calculated between the CQI value of the reference substream selected in reference determining section 510 and the CQI values of substreams other than the reference substream.

In feedback information generating section 560, feedback information for the transmission system is generated from the CQI value of the reference substream, the relative CQI values found for the streams other than the reference substream and the reference substream information.

Figure 10:
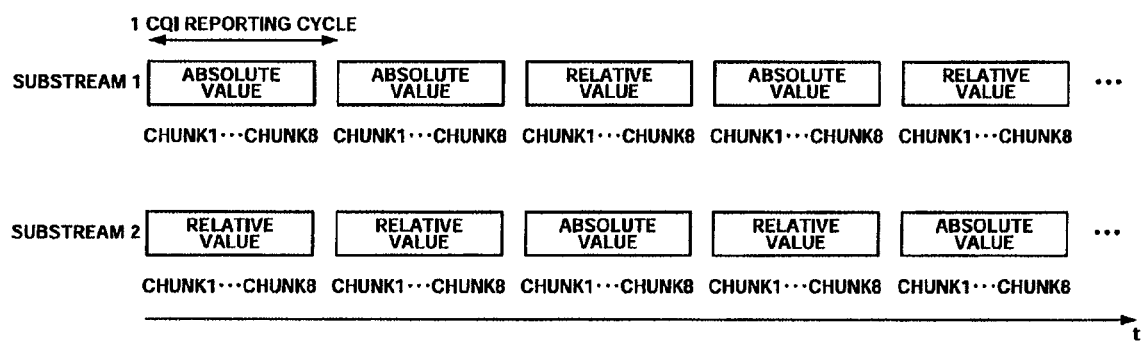
FIG. 10 explains the feedback information in Embodiment 3.

The feedback information generated in this feedback information generating section 560 will be explained with reference to FIG. 10. In the figure, for ease of the explanation, the case is shown where the number of substreams is two.

As shown in the figure, the substream associated with the CQI value of the highest received level is selected as the reference substream every reporting cycle. Then, as for the reference substream of each CQI reporting cycle, a CQI value determined based on an "average received level," which is an average of all chunks (i.e. chunks 1 to 8 in the figure) on a per CQI reporting cycle basis, is fed back to radio communication apparatus 600. Moreover, as for the substreams other than the reference substream, relative CQI values, which are relative to the CQI value determined for the reference substream on a per CQI reporting cycle basis, are fed back to radio communication apparatus 600. In the figure, substream 1 is selected as the reference substream in the first and second CQI reporting cycles, and substream 2 is selected as the reference substream in the third CQI reporting cycle. Then, as described above, the reference substream information (not shown in the figure) in the CQI reporting cycles is also fed back.

Incidentally, in what is referred to as a "2×2 MIMO communication system" in which the transmission system and the reception system each have two antennas, one bit is necessary for the reference substream information (e.g. stream index information identifying the reference substream), and, in a 4×4 MIMO communication system, only two bits are necessary.

In radio communication apparatus 600, in feedback information processing section 620, CQI values of the individual substreams are calculated from the feedback information from receiving section 210. To be more specific, the feedback information from radio communication apparatus 500 contains the CQI value of the reference substream, the relative CQI values found for the substreams other than the reference substream and the reference substream information, so that feedback information processing section 620 calculates the CQI value of each substream from the relative CQI values found between the CQI value of the reference substream specified from the reference substream information and the substreams other than the reference substream.

In this way, according to Embodiment 3, radio communication apparatus 500 has reference determining section 510 that selects the reference antenna (corresponding to the reference substream) from the antennas of the transmitting side (radio communication apparatus 600) based on the CQI values determined by CQI determining section 140, and relative value calculating section 550 calculates relative CQI values between the CQI value determined for the reference antenna selected in reference determining section 510 and the CQI values determined for the antennas other than the reference antenna. Especially, reference determining section 510 selects the antenna of the highest CQI value as the reference antenna.

By this means, the antenna of the best communication quality (e.g. SINR) is selected as the reference antenna, and, by feeding back the absolute value of communication quality of the reference antenna (the absolute value of the CQI value) and the relative values of the antennas other than the reference antenna (relative CQI values), the reliability of CQI feedback information of the substream of the best channel communication quality especially improves. As a result, the transmission system receiving the feedback information can perform transmission control based on reliable feedback information, thereby improving system throughput.

(Embodiment 4)

In Embodiment 2, the reference substream is fixed between all chunks. By contrast with this, in Embodiment 4, the substream of the best communication quality is selected as the reference substream on a per chunk basis. The embodiments are the same in that feedback is carried out using the absolute value of the CQI value with respect to the reference substream and relative CQI values with respect to substreams other than the reference substream. In this way, the substream of the best communication quality is selected as the reference substream per chunk, and by feeding back the absolute value of communication quality of the reference substream and the relative values of the substreams other than the reference substream, so that the reliability of feedback information improves. Moreover, by feeding back communication quality of individual chunks related to the substreams, frequency scheduling can be carried out efficiently in the transmission system. As a result, the transmission system receiving the feedback information can perform transmission control based on the feedback information, which is reliable and which contains communication quality per chunk, thereby improving system throughput.

Figure 11:
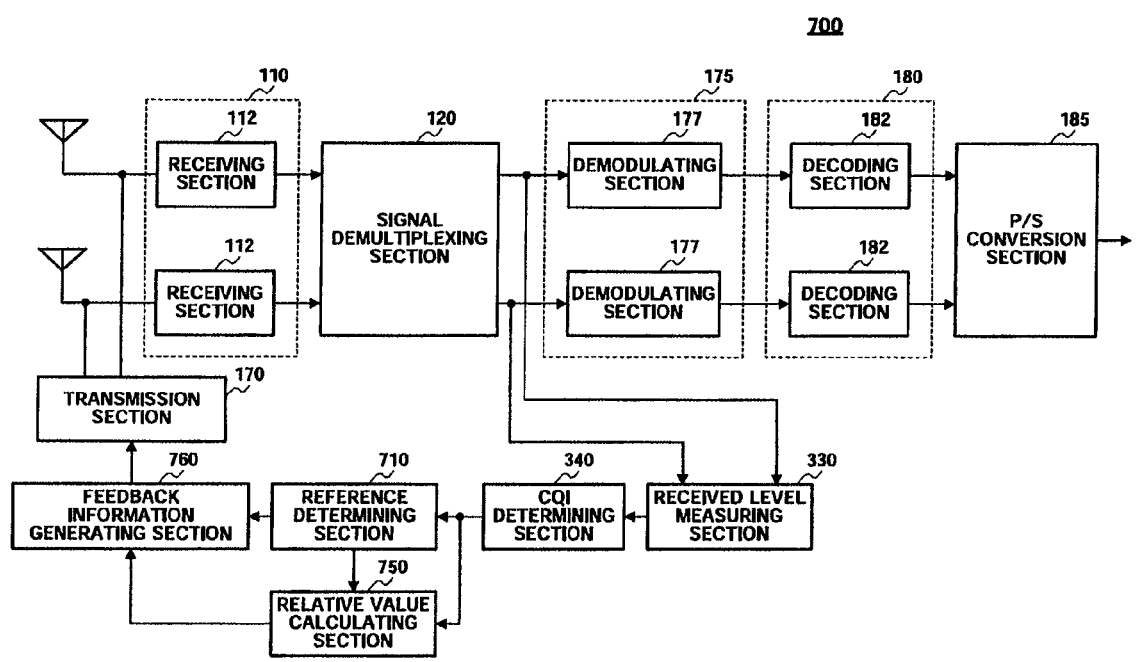
FIG. 11 is a block diagram showing a configuration of the radio communication apparatus of the receiving system according to Embodiment 4.

As shown in FIG. 11, radio communication apparatus 700 according to Embodiment 4 has reference determining section 710, relative value calculating section 750 and feedback information generating section 760.

Reference determining section 710 receives as input the CQI values of the individual chunks related to the substreams from CQI determining section 340 and determines the reference substream of each chunk. To be more specific, reference determining section 710 selects the substream associated with the CQI value of the highest received level as the reference substream on a per chunk basis. That is, reference determining section 710 selects the reference substream per chunk based on the received level of each chunk. Then, reference determining section 710 outputs information specifying the reference substream of each chunk (hereinafter may be referred to as "the reference chunk substream information") to relative value calculating section 750 and feedback information generating section 760.

Relative value calculating section 750 calculates relative chunk CQI values, which are the CQI values of the individual chunks, between the CQI value of the reference substream selected in reference determining section 710 and the CQI values of substreams other than the reference substream.

Figure 12:
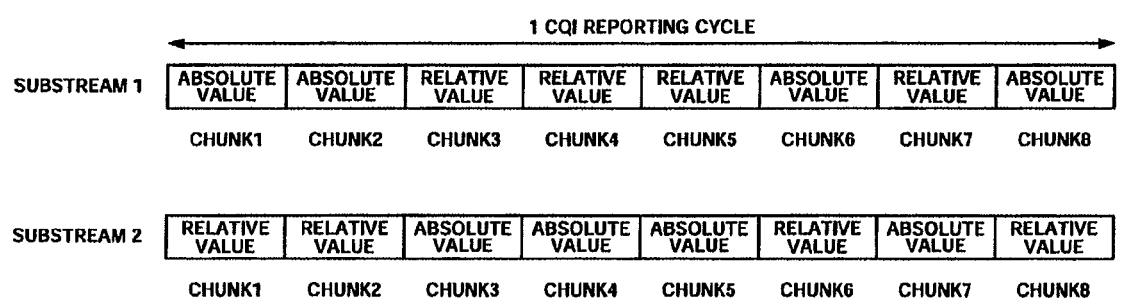
FIG. 12 explains the feedback information in Embodiment 4.

Feedback information generating section 760 generates feedback information (see FIG. 12) for the transmission system from the CQI value of the reference substream of each chunk, the relative chunk CQI values found for streams other than the reference substream per chunk and the reference chunk substream information.

Figure 13:
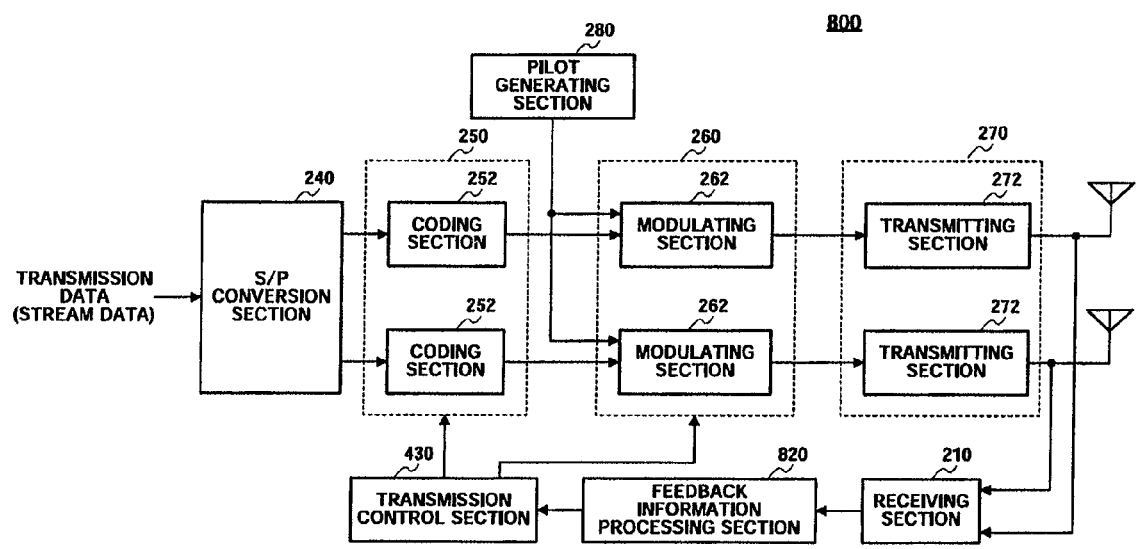
FIG. 13 is a block diagram showing a configuration of the radio communication apparatus of the transmitting system according to Embodiment 4.

As shown in FIG. 13, radio communicating apparatus 800 has feedback information processing section 820.

Feedback information processing section 820 calculates the CQI value of each chunk related to the substream from the feedback information from receiving apparatus 210. To be more specific, the feedback information from radio communication apparatus 700 contains the CQI value of the reference substream of each chunk, the relative chunk CQI values found for the substreams other than the reference substream per chunk and the reference chunk substream information, so that feedback information processing section 820 calculates the CQI values of the individual chunks related to the substreams from the CQI value of the reference substream per chunk and the relative chunk CQI values found for the substreams other than the reference substream specified from the reference chunk substream information.

In this way, according to Embodiment 4, radio communication apparatus 700 has reference determining section 710 that selects the reference antenna from the antennas of the transmitting side (radio communication apparatus 800) on a per chunk basis based on the CQI values of the individual chunks related to the transmitting antennas determined by CQI determining section 340, relative value calculating section 750 calculates relative chunk CQI values of the individual chunks between the reference antenna and the antennas other than the reference antenna, from the CQI value of the reference antenna per chunk and the CQI values of the antennas other than the reference antenna, and feedback information generating section 760 generates feedback information containing the CQI value of the reference antenna of each chunk, the relative chunk CQI values and the identification information of the reference antenna per chunk. Especially, reference determining section 710 selects the antenna of the highest CQI value on a per chunk basis as the reference antenna.

By this means, the antenna of the best communication quality (e.g. SINR) for each chunk is selected as the reference antenna, and by feeding back the absolute value of communication quality of the reference antenna (the absolute value of the CQI value) and the relative values of the antennas other than the reference antenna (relative chunk CQI values), the reliability of CQI feedback information of the substream of the best channel communication quality per chunk especially improves. Moreover, by feeding back communication quality per chunk related to the antennas, frequency scheduling can be carried out efficiently in the transmission system. As a result, the transmission system receiving the feedback information can perform transmission control based on the feedback information, which is reliable and which contains communication quality per chunk, thereby improving system throughput.

(Embodiment 5)

In Embodiment 1, the reference substream is fixed. By contrast with this, in Embodiment 5, the reference substream changes every reporting cycle according to a predetermined pattern. The embodiments are the same in that feedback is carried out using the absolute value of the CQI value with respect to the reference substream and relative CQI values with respect to substreams other than the reference substream. In this way, by changing the reference substream every predetermined cycle according to a predetermined cycle and by feeding back the absolute value of communication quality of the reference substream and the relative values of the substreams other than the reference substream, the reliability of the feedback information can be kept in good balance. As a result, the transmission system receiving the feedback information can perform transmission control based on reliable feedback information, thereby improving system throughput.

Figure 14:
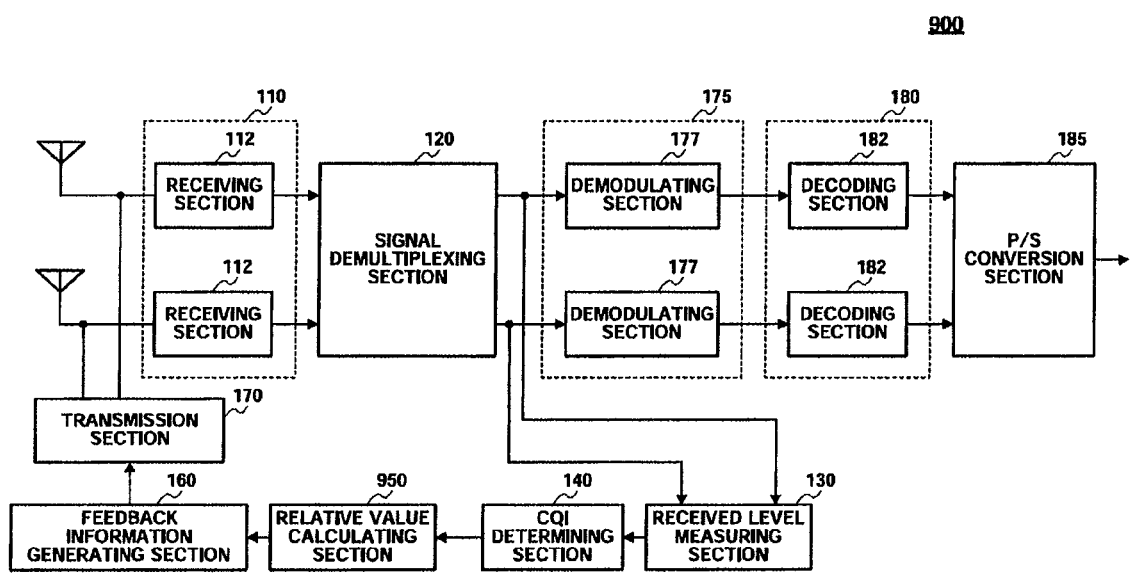
FIG. 14 is a block diagram showing a configuration of the radio communication apparatus of the receiving system according to Embodiment 5.

As shown in FIG. 14, radio communication apparatus 900 according to Embodiment 5 has relative value calculating section 950.

Relative value calculating section 950 changes the reference substream every CQI reporting cycle according to the predetermined pattern and calculates relative CQI values between the CQI value of the reference substream and the CQI values of substreams other than the reference substream.

In feedback information generating section 160, feedback information for the transmission system is generated from the relative CQI values between the CQI value of the reference substream per CQI reporting cycle and substreams other than the reference substream per CQI reporting cycle.

Figure 15:
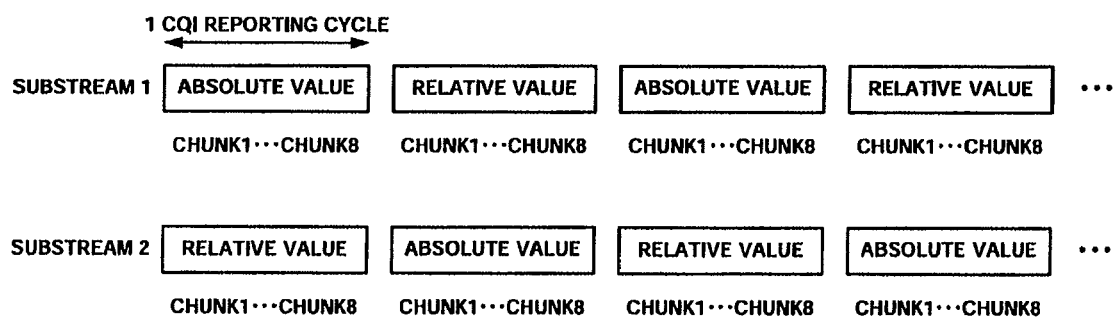
FIG. 15 explains the feedback information in Embodiment 5.

FIG. 15 shows the feedback information when the reference substream alternately changes between substream 1 and substream 2 every CQI reporting cycle.

Figure 16:
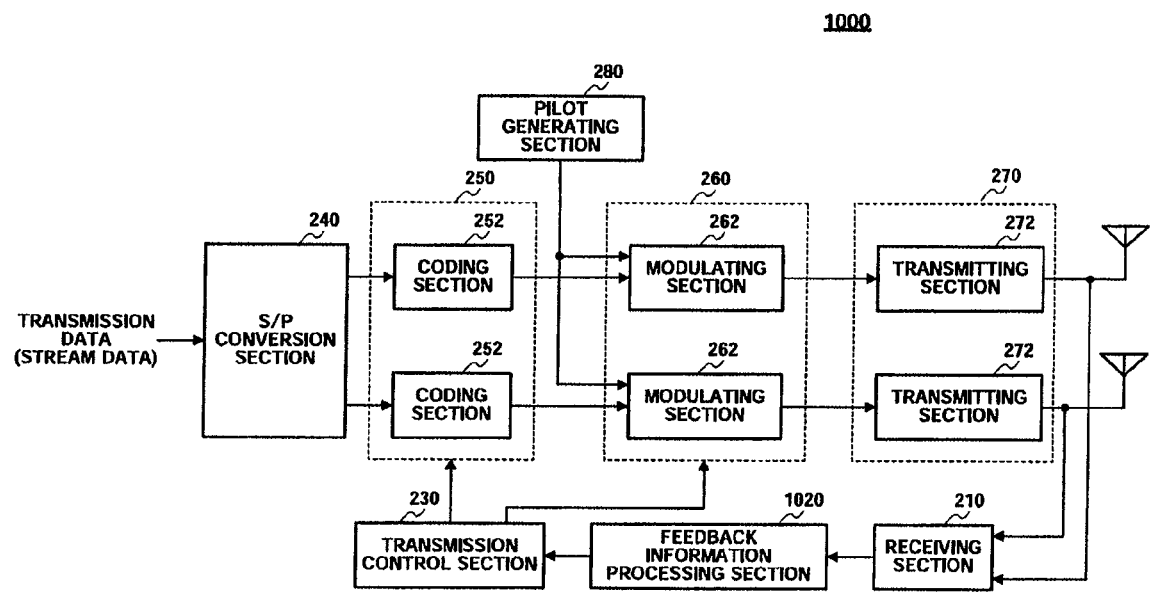
FIG. 16 is a block diagram showing a configuration of the radio communication apparatus of the transmitting system according to Embodiment 5.

As shown in FIG. 16, radio communication apparatus 1000 in Embodiment 5 has feedback information processing section 1020.

Feedback information processing section 1020 calculates the CQI value of each substream from the feedback information from receiving apparatus 210. To be more specific, as described above, the feedback information from radio communication apparatus 900 contains the CQI value of the reference substream per CQI reporting cycle and the relative CQI values found for the substreams other than the reference substream per CQI reporting cycle, so that feedback information processing section 1020 calculates the CQI value every CQI reporting cycle related to the substreams from the CQI value of the reference substream per CQI reporting cycle and the relative CQI values found for the substreams other than the reference substream per CQI reporting cycle.

Feedback information processing section 1020 needs to specify the reference substream in order to calculate the CQI values, and the CQI values of the substreams can be calculated if feedback information processing section 1020 acquires the change pattern of the reference substream in advance in relative value calculating section 950 of radio communication apparatus 900. If the change pattern of the reference substream is determined in advance between transmitting side and receiving side, signaling for reporting the reference substream is not necessary.

In this way, according to Embodiment 5, relative value calculating section 950 of radio communication apparatus 900 sequentially changes the reference antenna according to the predetermined change pattern of the reference antenna and calculates relative CQI values.

By this means, by changing the reference antenna according to the predetermined pattern and by feeding back the absolute value of communication quality of the reference antenna (the absolute value of the CQI value) and the relative values (relative CQI values) of the antennas other than the reference antenna, the reliability of the feedback information can be kept in good balance. As a result, the transmission system receiving the feedback information can perform transmission control based on reliable feedback information, thereby improving system throughput.

(Embodiment 6)

In Embodiment 2, the reference substream is fixed between all chunks. By contrast with this, in Embodiment 6, the reference substream changes on a per chunk basis according to a predetermined pattern. The embodiments are the same in that feedback is carried out using the absolute value of the CQI value with respect to the reference substream and relative CQI values with respect to substreams other than the reference substream. In this way, by changing the reference substream on a per chunk basis according to the predetermined pattern and by feeding back the absolute value of communication quality of the reference substream and the relative values of the substreams other than the reference substream, the reliability of the feedback information can be kept in good balance. Moreover, by feeding back communication quality per chunk related to the substreams, frequency scheduling can be carried out efficiently in the transmission system. As a result, the transmission system receiving the feedback information can perform transmission control based on the feedback information, which is kept reliability and which contains communication quality per chunk, thereby improving system throughput.

Figure 17:
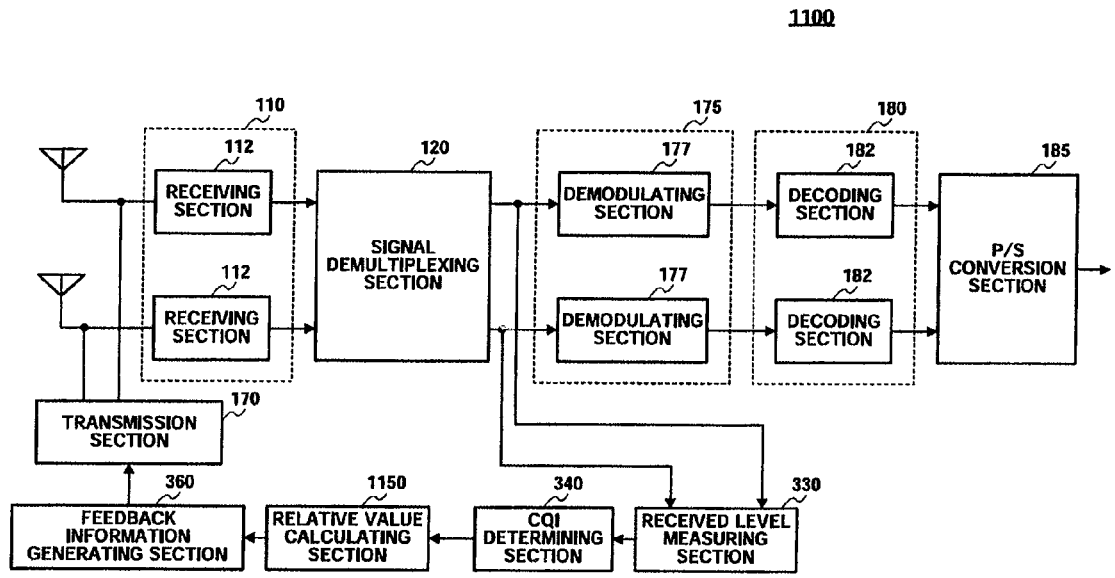
FIG. 17 is a block diagram showing a configuration of the radio communication apparatus of the receiving system according to Embodiment 6.

As shown in FIG. 17, radio communication apparatus 1100 according to Embodiment 6 has relative value calculating section 1150.

Relative value calculating section 1150 changes the reference substream according to the predetermined pattern on a per chunk basis and calculates relative chunk CQI values, which are the CQI values per chunk, between the CQI value of the reference substream and the CQI values of substreams other than the reference substream.

In feedback information generating section 360, feedback information for the transmission system is generated from the relative CQI values between the CQI value of each chunk for reference substream and substreams other than the reference substream of each chunk.

Figure 18:
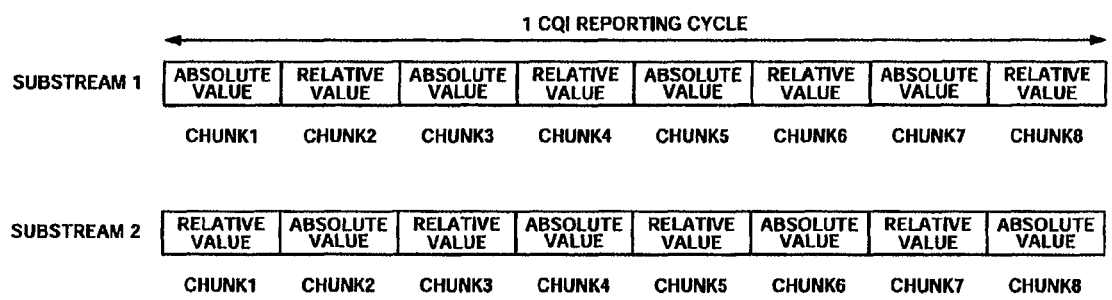
FIG. 18 explains the feedback information in Embodiment 6.

FIG. 18 shows the feedback information when the reference substream alternately changes between substream 1 and substream 2 on a per chunk basis.

Figure 19:
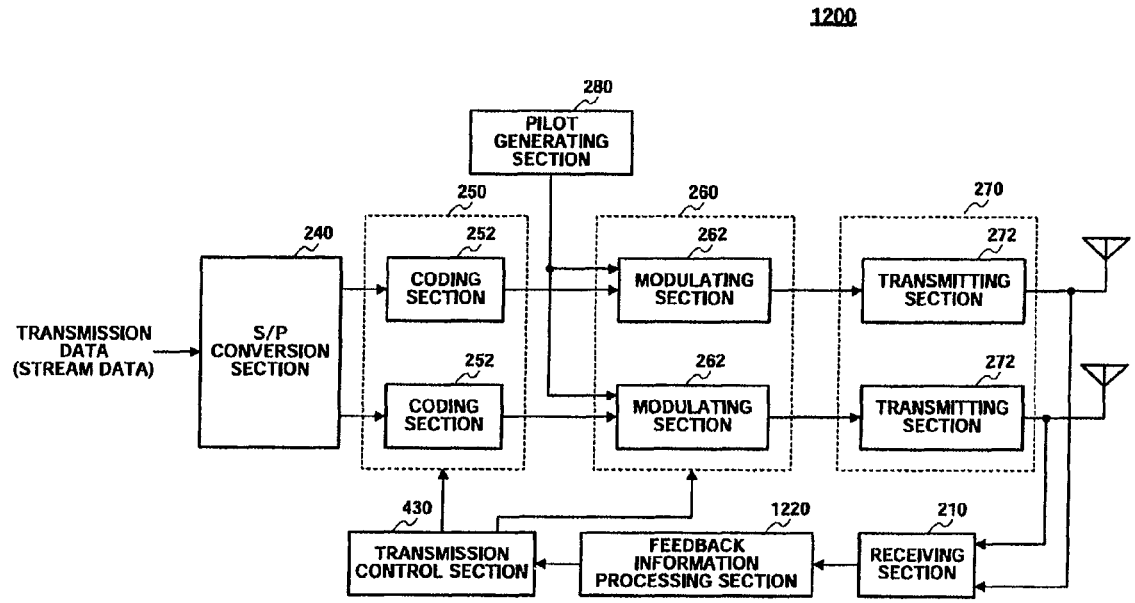
FIG. 19 is a block diagram showing a configuration of the radio communication apparatus of the transmitting system according to Embodiment 6.

As shown in FIG. 19, radio communication apparatus 1200 in Embodiment 6 has feedback information processing section 1220.

Feedback information processing section 1220 calculates the CQI value of each chunk for the substreams from the feedback information from receiving apparatus 210. To be more specific, as described above, the feedback information from radio communication apparatus 1100 contains the CQI value of each chunk for the reference substream and the relative chunk CQI values found for the substreams other than the reference substream of each chunk, so that feedback information processing section 1220 calculates the CQI values of the individual chunks related to the substreams from the CQI value of each chunk for the reference substream and the relative chunk CQI values found for the substreams other than the reference substream of each chunk.

Feedback information processing section 1220 needs to specify the reference substream of each chunk in order to calculate the CQI values, and CQI values of individual chunks related to the substreams can be calculated if feedback information processing section 1220 acquires the change pattern of the reference substream in advance in relative value calculating section 1150 of radio communication apparatus 1100. If the change pattern of the reference substream is determined in advance between transmitting side and receiving side, signaling for reporting the reference substream is not necessary.

In this way, according to Embodiment 6, radio communication apparatus 1100 has: received level measuring section 330 that measures the received levels of the individual pilot signals transmitted from the antennas of the transmitting side (radio communication apparatus 1200); CQI determining section 340 that determines the CQI value of each transmitting antenna based on the received levels; relative value calculating section 1150 that calculates relative CQI values showing the relative values of the CQI values between the reference antenna and the antennas other than the reference antenna, from the CQI value determined for the reference antenna and the CQI values determined for the antennas other than the reference antenna, in the transmitting antennas by CQI determining section 340; and feedback information generating section 360 that generates feedback information for the transmitting side including the CQI values of the reference antenna and the relative CQI values. Received level measuring section 330 measures the received levels of the individual chunks formed with a plurality of subcarriers, CQI determining section 340 determines the CQI value of each chunk related to the transmitting antennas based on the received levels, and relative value calculating section 1150 changes the reference antenna according to the predetermined pattern per chunk and calculates relative chunk CQI values showing the relative values of the CQI values of the individual chunks between the reference antenna and the antennas other than the reference antenna.

By this means, by changing the reference antenna on a per chunk basis according to the predetermined pattern and by feeding back the absolute value of communication quality of the reference antenna (the absolute value of the CQI value) and the relative values of the antennas other than the reference antenna (the relative chunk CQI values), the reliability of the feedback information can be kept in good balance. Moreover, by feeding back communication quality per chunk related to the antennas, frequency scheduling can be carried out efficiently in the transmission system. As a result, the transmission system receiving the feedback information can perform transmission control based on the feedback information, which is kept reliability and which contains communication quality per chunk, thereby improving system throughput.

Industrial Applicability

The MIMO receiving apparatus and the MIMO transmitting apparatus of the present invention are suitable for use in reducing an amount of feedback information and system traffic.

The invention claimed is:

1. A radio communication apparatus comprising:
a transmitting unit configured to transmit, to a receiving apparatus, first data and second data from a plurality of antennas for spatial-multiplexing using a plurality of blocks, into which a plurality of consecutive subcarriers in a frequency domain are divided; and
a receiving unit configured to receive a first absolute channel quality indicator (CQI) value and a relative CQI value which are transmitted from the receiving apparatus,
wherein, at the receiving apparatus, the first absolute CQI value is calculated per each of the blocks for the first data, a second absolute CQI value is calculated per each of the blocks for the second data, and the relative CQI value of the second absolute CQI value is calculated with respect to the first absolute CQI value, per each of the blocks, from the first absolute CQI value and the second absolute CQI value in the same block, and
wherein, at the receiving apparatus, the relative CQI value of the second absolute CQI value in the first block of the plurality of blocks for the second data is calculated with respect to the first absolute CQI value in the first block of the plurality of blocks for the first data, and the relative CQI value of the second absolute CQI value in the second block of the plurality of blocks for the second data is calculated with respect to the first absolute CQI value in the second block of the plurality of blocks for the first data.

2. The radio communication apparatus according to claim 1, wherein, at the receiving apparatus, the relative CQI value of the second absolute CQI value in one of the plurality of blocks for the second data is calculated with respect to the first absolute CQI value in the same one of the plurality of blocks for the first data.

3. The radio communication apparatus according to claim 1, wherein said receiving unit receives feedback information comprising the first absolute CQI value and the relative CQI value of the second absolute CQI value.

4. The radio communication apparatus according to claim 1, wherein said transmitting unit performs a frequency scheduling in response to the received first absolute CQI value and the received relative CQI value of the second absolute CQI value.

5. The radio communication apparatus according to claim 1, further comprising a modulating unit configured to modulate the first data and the second data, wherein said transmitting unit transmits the modulated first data and the modulated second data.

6. The radio communication apparatus according to claim 5, wherein said modulating unit modulates the first data and the second data per each one of the data.

7. The radio communication apparatus according to claim 5, wherein said modulating unit modulates the first data and the second data in response to the received first absolute CQI value and the received relative CQI value of the second absolute CQI value.

8. The radio communication apparatus according to claim 1, wherein the absolute CQI value indicates a code rate or a modulation scheme.

9. A radio communication apparatus comprising:
a modulating unit configured to modulate first data and second data per each one of the data,
a transmitting unit configured to transmit, to a receiving apparatus, the modulated first data and the modulated second data from a plurality of antennas for spatial-multiplexing using a plurality of blocks, into which a plurality of consecutive subcarriers in a frequency domain are divided; and
a receiving unit configured to receive a first absolute channel quality indicator (CQI) value and a relative CQI value which are transmitted from the receiving apparatus,
wherein, at the receiving apparatus, the first absolute CQI value is calculated per each of the blocks for the first data, a second absolute CQI value is calculated per each of the blocks for the second data, the relative CQI value of the second absolute CQI value is calculated with respect to the first absolute CQI value, per each of the blocks, from the first absolute CQI value and the second absolute CQI value, and the relative CQI value of the second absolute CQI value in one of the plurality of blocks for the second data is calculated with respect to the first absolute CQI value in the same one of the plurality of blocks for the first data, and
wherein, at the receiving apparatus, the relative CQI value of the second absolute CQI value in the first block of the plurality of blocks for the second data is calculated with respect to the first absolute CQI value in the first block of the plurality of blocks for the first data, and the relative CQI value of the second absolute CQI value in the second block of the plurality of blocks for the second data is calculated with respect to the first absolute CQI value in the second block of the plurality of blocks for the first data.

10. A radio communication method comprising:

transmitting, to a receiving apparatus, first data and second data from a plurality of antennas for spatial-multiplexing using a plurality of blocks, into which a plurality of consecutive subcarriers in a frequency domain are divided; and receiving a first absolute channel quality indicator (CQI) value and a relative CQI value which are transmitted from the receiving apparatus, wherein, at the receiving apparatus, the first absolute CQI value is calculated per each of the blocks for the first data, a second absolute CQI value is calculated per each of the blocks for the second data, and the relative CQI value of the second absolute CQI value is calculated with respect to the first absolute CQI value, per each of the blocks, from the first absolute CQI value and the second absolute CQI value in the same block, and wherein, at the receiving apparatus, the relative CQI value of the second absolute CQI value in the first block of the plurality of blocks for the second data is calculated with respect to the first absolute CQI value in the first block of the plurality of blocks for the first data, and the relative CQI value of the second absolute CQI value in the second block of the plurality of blocks for the second data is calculated with respect to the first absolute CQI value in the second block of the plurality of blocks for the first data.

11. The radio communication method according to claim 10, wherein, at the receiving apparatus, the relative CQI value of the second absolute CQI value in one of the plurality of blocks for the second data is calculated with respect to the first absolute CQI value in the same one of the plurality of blocks for the first data.

12. The radio communication method according to claim 10, wherein the first absolute CQI value and the relative CQI value of the second absolute CQI value are received as feedback information.

13. The radio communication method according to claim 10, further comprising performing a frequency scheduling in response to the received first absolute CQI value and the received relative CQI value of the second absolute CQI value.

14. The radio communication method according to claim 10, further comprising modulating the first data and the second data, wherein the modulated first data and the modulated second data are transmitted.

15. The radio communication method according to claim 14, wherein the first data and the second data are modulated per each one of the data.

16. The radio communication method according to claim 14, wherein the first data and the second data are modulated in response to the received first absolute CQI value and the received relative CQI value of the second absolute CQI value.

17. The radio communication method according to claim 10, wherein the absolute CQI value indicates a code rate or a modulation scheme.

* * * * *